INVENTOR.
Josef Pausch
BY Whiteley and Caine
ATTORNEYS

United States Patent Office 3,436,899
Patented Apr. 8, 1969

3,436,899
SUPERSONIC CLEANING OF FILTERING MEDIA
Josef Pausch, Hopkins, Minn., assignor to Aerodyne Machinery Corporation, Hopkins, Minn.
Continuation of application Ser. No. 474,101, July 22, 1965. This application Mar. 4, 1968, Ser. No. 710,394
Int. Cl. B01d 29/38, 29/24, 29/10
U.S. Cl. 55—302                            1 Claim

ABSTRACT OF THE DISCLOSURE

To dislodge accumulated dust from the outer surface of a porous filter tube, a nozzle containing a converging diverging passage is disposed centrally in the axis of the outlet end of the filter tube and in spaced relation to the tube to permit the normal egress of the filtered air, said nozzle is connected to a source of compressed gas to accelerate said gas to a supersonic rate and discharge the same within the interior of the filter tube.

---

This application is a continuation of Ser. No. 474,101 filed July 22, 1965, now abandoned.

The present invention relates to the cleaning of filtering media. More particularly, it relates to an apparatus for removing particles from a filtering medium by the use of a gas accelerated to a supersonic condition.

It is well known that in the process of filtering particles from a gas-particle mixture, the filtering element or medium after a period of time accumulates particles to a degree which may ultimately clog the filtering element sufficiently to block the flow of gas through it, thereby retarding the filtering operation. Various means have been employed in an attempt to periodically clean the medium of accumulated particles. Mechanical means have been employed to shake or vibrate the filtering elements or medium, but perhaps the most common form of cleaning involves reversal of the pressure differential across the filtering medium to provide a blowback or backwash effect. This method often proves rather ineffectual, however, especially where there has been considerable caking of the accumulated particles upon the filter or where the particle size produces clogging of the pores of the filtering element; furthermore such methods of cleaning may result in excessive wear of more delicate filtering materials.

The use of sound waves in the cleaning of filtering elements has also been employed, but the vibration imparted to the filtering medium by sound waves is slight and cleaning by the use of such sound waves must often be employed only in conjunction with other cleaning means, such as backwashing or mechanical movement of the filter, or both.

An object of the present invention is to provide a means of cleaning a porous filtering element by accelerating a compressed gas to a supersonic condition and directing it against the filtering element to remove the accumulated dust particles therefrom.

Another object of the invention is to provide means for cleaning filtering elements whereby the accumulated particles are effectively dislodged from the filter, and more particularly where a cake of particles is formed, to break up this cake to thoroughly clean the filtering element.

Another object of this invention is to provide a means of filter cleaning which avoids the problem of excessive wear and deterioration of the filtering element, as occurs in mechanical jarring or shaking, or in the use of extreme back pressures.

A further object of the present invention is to provide a supersonic apparatus for the dislodgement and removal of solid particles from porous filtering elements.

These and other objects and advantages of the present invention will be apparent from the following specification and claim; reference being made to the accompanying drawings, wherein:

Figure 1:
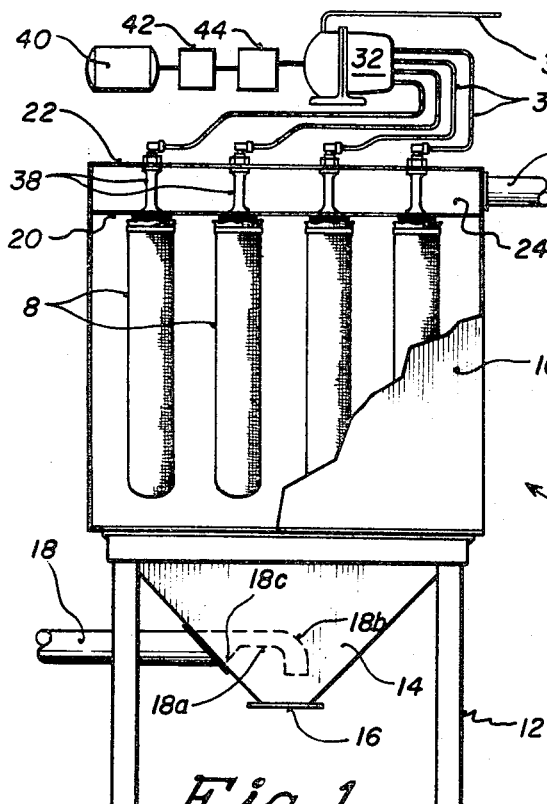
FIG. 1 is a diagram of a specific filtering apparatus embodying the filter cleaning method.

A specific embodiment of the filter cleaning method is represented in FIG. 1 by a gas filtering apparatus designated in its entirety by reference numeral 6. A multiplicity of tubular fabric filtering elements 8 are contained within an enclosed rectangular filter housing 10 which is supported at its base on a leg framework 12. The lower portions of the walls of housing 10 converge to form a dust receiving hopper 14, which is positioned within the leg framework 12, and which terminates in an opening 16 at the lower extremity of hopper 14.

An inlet conduit 18 extends into the middle portion of hopper 14, and has an opening 18a in the lower surface of a constricted portion of the conduit. An end portion 18b of the conduit 18 within the hopper 14 is turned downwardly at right angles to the main portion of the conduit. A deflector 18c extends upwardly from the lower interior surface of the conduit 18 and is designed to direct the flow of the incoming gas-particle mixture along the upper interior surface of the conduit, whereby a portion of the gas and the larger suspended particles are directed along the interior surface of the conduit 18 and out the opening 16 of hopper 14. The remaining gas and smaller suspended particles pass through the opening 18a and upwardly into the lower portion of the filter housing 10, and into contact with the exterior surface of tubular filtering elements 8. The configuration of conduit 18 thus removes a portion of the larger particles prior to filtration, and moreover, the small amount of gas directed through opening 16 prevents that opening from becoming clogged by accumulated particles.

Figure 3:
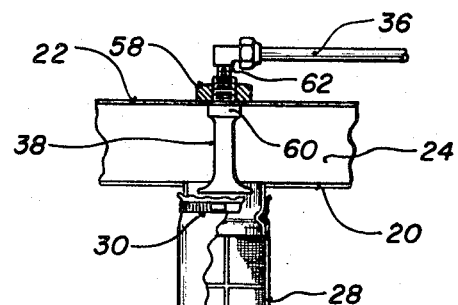
FIG. 3 is an enlarged view of a filtering element, and an acceleration tube, a series of which are shown in diagram form in FIG. 1.

A partition 20 extends transversely from the upper portion of the walls of housing 10, and lies parallel to a top panel 22 of filter housing 10 to form a clean gas chamber 24 which extends laterally to an outlet conduit 26. The upper open ends of the multiplicity of filtering elements 8 are affixed to circular openings in the partition 20, and extend downwardly transversely from the partition 20 into the filter housing 10. As shown in FIG. 3, a cylindrical supporting framework 28 extends transversely from the partition 20, and provides support for the tubular filtering element 8 to maintain its tubular shape and prevent its collapse from the reduced pressure within its interior. The upper portion of the filtering element 8 is secured to the cylindrical framework 28 by a circular clamp 30.

Dust ladened gases are drawn into the filter housing 10 by the application of a reduced pressure on outlet conduit 26, by means not shown. The gases are drawn into conduit 18, through the upper portion of hopper 14, and into the filter element housing 10, where the dust particles are accumulated on the exterior surface of filtering element 8, and the filtered, substantially particle-free gas passes upwardly through the interior of the tubular filtering element 8 into the clean gas chamber 24 and out through the outlet conduit 26.

After a period of such operation, particles begin to accumulate on the filtering elements 8, and must be removed to maintain the filtering operation. The present invention provides a method for cleaning the filtering elements with a gas in a supersonic condition.

Figure 4:
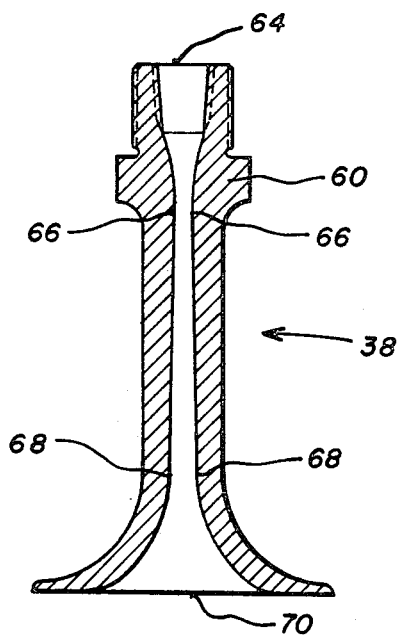
FIG. 4 is an enlarged cross section of the acceleration tube shown in FIG. 3.

A distributor 32 is adapted to receive pressurized gas through a conduit 34, and distribute it to a plurality of conduits 36, which carry the gas to a plurality of acceleration tubes or channels 36, shown in enlarged cross section in FIG. 4. The distributor 32 is actuated by a motor 40 which is opertively connected to the distributor 32 through a gear reduction device 42 and a variable speed mechanism 44.

Figure 2:
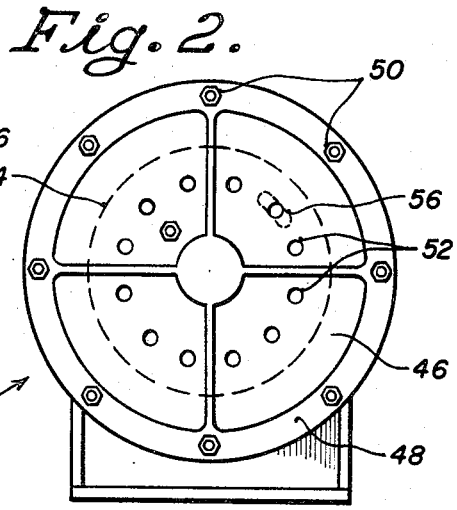
FIG. 2 is an end view from the right side of a portion of FIG. 1 showing some details of a distributor used in conjunction with the apparatus.

Referring now to FIG. 2, the gas distributor 32 is provided with a cylindrical body 46 which is joined to a cover plate, not shown, by a peripheral flange 48 that is secured by bolts 50. The face of the cylindrical body 46 is provided with a multiplicity of outlet ports 52, each of which is threaded for connection with one of the conduits 36. Supported on the end of a driving member or shaft, not shown, is a driven member or rotor plate, indicated by broken line 54 in FIG. 2, which may move longitudinally on the shaft in the direction of outlet ports 52. The rotor plate 54 contains one or more eliptical apertures or slots, indicated by broken line 56, which are adapted to register with the outlet ports 52. Compressed gas is introduced into the cylindrical body 46 by the conduit 34, as shown in the diagram in FIG. 1, and as the aperture 56 registers with a single outlet port 52, compressed gas is permitted to pass into a single conduit 36 and is directed to a single acceleration tube or channel 38.

Referring to FIGS. 3 and 4, the gas acceleration tube or channel 38 which extends transversely from the top panel 22, is positioned so as to direct the flow of compressed gas into the end opening of a single tubular filtering element 8. The upper portion of tube 38, which extends through top panel 22, is threaded on its exterior surface to receive a nut 58 which co-acts with a circular lug 60 extending transversely from tube 38 to secure the tube to the top panel 22 and seal the tube within the clean gas chamber 24. A threaded portion 62 on the end of conduit 36 as shown in FIG. 3, is adapted to be received in threads in an opening 64 in the upper portion of the acceleration tube 38.

Referring to FIG. 4, the inner diameter of tube 38 is a closed continuous channel which curves downwardly from the base of the threaded opening 64 in a converging manner to a point 66 where the inner diameter gradually tapers straightly and outwardly to a point 68 where it curves outwardly to form a flared opening 70, through which the compressed gas is directed into the filtering element 8.

The operation of the foregoing apparatus as a specific embodiment of the invention is as follows:

Solid particles accumulated on the filtering elements 8 during the filtering operation are removed at periodic intervals to prevent clogging of the filtering elements and to maintain the filtering operation. As one of the plurality of filtering elements 8 is being cleaned of the accumulated particles, the remainder of filtering elements 8 continue the filtering operation. Relatively clean compressed gas is introduced into distributor 32 through conduit 34, and the rotor plate 54 of distributor 32, as shown in FIG. 2, is rotated to register the aperture 56 with a single outlet port 52 in the face of the cylindrical body 46. As the end of the aperture 56 registers with the outlet port 52, the pressure of the gas directed through the acceleration tube 38 and into filtering element 8 begins to rise, creating a backwash effect on the filtering element 8. As further registration of aperture 56 with outlet port 52 occurs, the pressure of the gas in the closed tube or channel 38 rises to a point where the configuration of the tube is able to accelerate the gas to a supersonic condition, and as the gas passing through tube 38 attains the speed of sound, it begins to produce waves 72 in the filtering material of the filtering element 8, as illustrated in FIG. 3. The waves 72 travel down the filtering element 8 and effectively dislodge particles accumulated on the filter, and in conjunction with the wave motion, cleaning is further enhanced by the backwash effect of reversed pressure across the filtering medium. The size of the waves 72 produced in the filtering element 8 varies inversely with the frequency, and the frequency of the waves varies with the amount of tapering of the inner diameter of tube 38; greater tapering producing greater wave frequency.

After a period of time, as the rotor plate 54 of distributor 32 continues to move, the opening between aperture 56 and the outlet port 52 begins to close, and the flow of compressed gas through the acceleration tube 38 begins to gradually decrease, until there is finally no admission of compressed gas, and the filter having been cleaned of particles begins to operate as before. Since the cleaning involves a gradual increase in pressure to a maximum point, and then a gradual return to filtering pressures over a period of time as opposed to a sharp blast of compressed gas, the particles once dislodged from the filtering element 8 are given an opportunity to fall into the hopper 14, and are not immediately drawn back onto the filtering element before having a chance to settle. The period of time for which gas is passed through acceleration tube 38 is governed by the speed of rotation of rotor 54 on distributor 32, and by the length of the eliptical aperture 56 in rotor plate 54 relative to the diameter of the outlet port 52 in the cylindrical distributor body 40.

After one filtering element 8 has been cleaned, as described above, the rotating plate 54 on distributor 32 moves the aperture 56 to an adjoining outlet port 52 and the process of cleaning with waves produced by gas in a supersonic state is repeated on another of the plurality of filtering elements 8. The cleaning and filtering are thus carried on continuously in the apparatus, and there is no interruption in the overall process.

The foregoing procedures are now illustrated by the following specific example:

In a gas filtering apparatus, as described above and shown in diagram in FIG. 1, a plastic dust is separated from a mixture of such dust suspended in air by passing the air through a tubular fabric filtering element 8 which is 7½ inches in diameter and 72 inches in length. A reduced pressure somewhat below atmospheric pressure is maintained on outlet conduit 26, by means not shown, causing the dust-air mixture to be drawn into the filtering element housing 10 through inlet conduit 18, and causing the air to be drawn through the filtering material of filtering element 8, thereby accumulating the plastic dust on the outer surface of the filtering element 8.

A pressure of 80 p.s.i. is applied to the inlet conduit 34 of distributor 32 to achieve the desired supersonic effect in the acceleration tube 38. The rotor plate 54 of distributor 32, as shown in FIG. 2, is driven at a speed such that the aperture 56 of rotor plate 54 is in registration with the outlet port 52 for a period of ½ second. The supersonic effect, and the frequency of the waves thereby produced, are dependent upon the configuration of the inner diameter of the acceleration tube 38, wherein: referring to FIG. 4, the inner diameter of tube 38 is curved on a radius of 3.725 inches from an opening at the base of the thread opening 64 to a point 66, which is .250 inch in diameter, from which the inner diameter tapers straightly and outwardly over a length of 3.75 inches to a point 68 which is 0.325 inch in diameter, and from which the inner diameter curves outwardly on a radius of 2 inches to provide a flared opening 70 having an outer diameter of 4.5 inches. The overall length of tube 38 is 7.75 inches.

In a closed acceleration tube 38 having an inner diameter of the foregoing configuration, air injected into the tube at a pressure of 80 p.s.i. is accelerated to a speed greater than the speed of sound, thereby producing waves 72 in the filter element 8, as shown in FIG. 3, at a frequency of approximately 10 to 15 waves per second.

The invention herein described thus provides a relatively simple means of cleaning a filtering medium by the use of supersonic waves which in one form of the invention act in conjunction with the reverse pressure or backwash across the filtering medium to effectively dislodge accumulated particles.

I claim:
1. In an apparatus for filtering solid particles from gases, embodying:
  a porous flexible filtering tube having an open outlet end for filtered gas and closed at the other end;
  an enclosure containing the tube;
  dividing means within said enclosure separating the interior thereof into an inlet portion and an outlet portion, and having an opening therein, said tube having its open outlet end secured around said opening;
  an inlet conduit connected to said inlet portion of said enclosure;
  an outlet conduit connected to said outlet portion of said enclosure;
  a nozzle extending through said outlet portion in axial alignment with said tube, said nozzle containing an inlet and an outlet with a tubular connecting passage therebetween formed with a progressively tapering convergent surface leading to a progressively diverging surface and terminating in a diffuser portion;
  said nozzle disposed with its outlet extending centrally through said outlet end of said tube into the interior of said filtering tube and in spaced relationship to the interior surface thereof thereby forming an annular passage between said nozzle and the interior of said outlet end of said tube through which the filtered gas flows in passing outwardly from the interior of said filtering tube to the outlet portion of the enclosure;
  a source of compressed gas;
  and a gas conduit directly connected to the inlet end of said nozzle and to said source of compressed gas providing a flow connection therebetween admitting said gas substantially at its existing pressure into said passage.

References Cited

UNITED STATES PATENTS

| Re: 24,954 | 3/1961 | Church | 55—302 |
| 2,664,850 | 1/1954 | Smith. | |
| 3,095,289 | 6/1963 | Egan | 55—341 |

FOREIGN PATENTS

| 225,059 | 10/1959 | Australia. |
| 880,043 | 10/1961 | Great Britain. |
| 930,151 | 7/1963 | Great Britain. |
| 125,118 | 4/1960 | U.S.S.R. |

HARRY B. THORNTON, *Primary Examiner.*

B. NOZICK, *Assistant Examiner.*

U.S. Cl. X.R.

55—341